(12) United States Patent
Le Brun et al.

(10) Patent No.: US 12,000,414 B2
(45) Date of Patent: Jun. 4, 2024

(54) DOUBLE CORRECTOR FOR ASYMMETRICAL MECHANISM COMPENSATION

(71) Applicant: SAFRAN AIRCRAFT ENGINES, Paris (FR)

(72) Inventors: Christophe Marc Alexandre Le Brun, Moissy-Cramayel (FR); Sébastien Jean Fernand Deneuve, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 441 days.

(21) Appl. No.: 17/414,514

(22) PCT Filed: Dec. 17, 2019

(86) PCT No.: PCT/FR2019/053116
§ 371 (c)(1),
(2) Date: Jun. 16, 2021

(87) PCT Pub. No.: WO2020/128298
PCT Pub. Date: Jun. 25, 2020

(65) Prior Publication Data
US 2022/0065270 A1    Mar. 3, 2022

(30) Foreign Application Priority Data

Dec. 17, 2018    (FR) ........................ 1873075

(51) Int. Cl.
*G05B 11/42*    (2006.01)
*F15B 13/02*    (2006.01)
*F16H 57/04*    (2010.01)

(52) U.S. Cl.
CPC .............. *F15B 13/02* (2013.01); *G05B 11/42* (2013.01); *F16H 57/0413* (2013.01)

(58) Field of Classification Search
CPC ....... F15B 13/02; G05B 11/42; F16H 57/0413
(Continued)

(56) References Cited

U.S. PATENT DOCUMENTS

| 6,272,401 | B1 * | 8/2001 | Boger | .................... | G05B 11/42 |
| | | | | | 700/282 |
| 6,745,084 | B2 | 6/2004 | Boger et al. | | |

(Continued)

FOREIGN PATENT DOCUMENTS

| EP | 1 441 266 A2 | 7/2004 |
| EP | 1 441 266 A3 | 5/2005 |

OTHER PUBLICATIONS

International Search Report for PCT/FR2019/053116 dated Mar. 31, 2020.

(Continued)

*Primary Examiner* — Jigneshkumar C Patel
(74) *Attorney, Agent, or Firm* — Sughrue Mion, PLLC

(57) ABSTRACT

The invention concerns a method for controlling a mechanism (10) displaying asymmetrical behaviour, the mechanism (10) comprising a first operating direction (F+) and a second operating direction (F−), the control method making it possible to generate, using a control module (24) of a computer (20), a control signal (x_com) from a setpoint signal (x_cons), in which—when the setpoint signal (x_cons) indicates that the mechanism (10) should be operated in the first direction (F+), the control module (24) applies a first corrector (100) to the setpoint signal (x_cons) in order to generate a control signal (x_com),—when the setpoint signal (x_cons) indicates that the mechanism (10) should be operated in the second direction (F−), the control module (24) applies a second corrector (100) to the setpoint signal (x_cons) in order to generate a control signal (x_com), and in which the first and second correctors (100, 200) have different parameters (Kp1, Kp2, Ti1, Ti2), in order (Continued)

to compensate for the asymmetrical behaviour of the mechanism (10).

9 Claims, 2 Drawing Sheets

(58) Field of Classification Search
USPC .......................................................... 700/41
See application file for complete search history.

(56) References Cited

U.S. PATENT DOCUMENTS

2010/0122535 A1* 5/2010 Finkbeiner ............. G05B 11/42
60/734
2015/0204454 A1* 7/2015 Hurst .................... F16K 31/385
137/870

OTHER PUBLICATIONS

Search Report issued Sep. 16, 2019 by the French Patent Office in application No. 1873075.

* cited by examiner

DOUBLE CORRECTOR FOR ASYMMETRICAL MECHANISM COMPENSATION

CROSS REFERENCE TO RELATED APPLICATIONS

This application is a National Stage of International Application No. PCT/FR2019/053116 filed Dec. 17, 2019, claiming priority based on France Patent Application No. 1873075 filed Dec. 17, 2018, the entire contents of each of which being herein incorporated by reference in their entireties.

GENERAL TECHNICAL FIELD

The invention relates to the electronic valve regulation, particularly the valve control check.

The invention finds application in particular in aircraft turbomachines, such as the open rotor for example.

The invention will be described in this context, but is applicable to any mechanism having an unwanted or unintentional functional dissymmetry.

STATE OF THE ART AND PRESENTATION OF THE PROBLEM IDENTIFIED BY THE APPLICANT

The Open Rotor is an aircraft engine with an architecture consisting of a gas generator and of a propulsion unit equipped with a power turbine, a propeller gearbox (PGB) and a pair of unducted counter-rotating propellers with variable pitch.

The transmission of very high torques to the propellers results in high thermal rejections that can damage the PGB as well as other equipment designed to operate in some restricted temperature ranges.

The PGB is both cooled and lubricated with oil. In order to obtain the desired temperature, a three-way valve of a hydraulic circuit is used to manage the ratio between oil cooled by a water exchanger and the uncooled oil:
  in the "0" stop position (which corresponds to a 0V command), the oil at the outlet of the circuit only comes from the oil passing through the exchanger,
  in the "10" stop position (which corresponds to a 10V command), the oil at the outlet of the circuit is not cooled,
  an intermediate position corresponds to a mixture between the bypassed oil and the cooled oil.

A cascade-type regulation has been adopted to meet the performance requirements over the entire flight envelope of the engine:
  a global loop is used to servo-control the temperature upstream of the pumps and allows determining a position setpoint for the valve x_cons, from the temperature deviation T_cons−T_mes (obtained using a sensor 35),
  a local loop is used to servo-control the position of the valve. The local loop allows delivering the control signal x_com to the valve, from the position deviation x_e.

The architecture of the regulation is schematized in FIG. 1 (with a valve 10 and an oil circuit 15). This FIG. 1 will be described in more detail below.

However, in use, the Applicant has noticed that the valve does not have the expected response characteristics. This will be presented below.

Modeling of the Situation

First, the physical reality of the valve was first modeled. For that purpose, the valve model was first identified accurately using steps and ramps of different slopes, that is to say by applying voltage steps and ramps at the inlet of the valve and by observing the outlet, that is to say the movement of the valve (or its speed). These different inlets comprise positive control variations (such as a positive voltage variation), which tend to move the valve in a positive operating direction F+, and negative control variations variations (such as a negative voltage variation), which tend to move the valve in a negative operating direction F−.

The conclusions are the following.

The behavior of the valve is roughly similar depending on the operating points (i.e. regardless of the initial position of the valve, at least first order).

The valve generally behaves as a function of first-order transfer with a low response time (fast transfer) with a low pure delay, in response to a positive control variation.

The valve generally behaves as a function of first-order transfer with a much greater response time (slow transfer) with a large pure delay, in response to a negative control variation.

The valve has a non-linear behavior. However, the conventional check strategies are based on linear models, thereby generating difficulties.

The resulting model is finally composed of two functions of first-order transfer with different poles (factor 5 between the poles) and with different pure delays.

The bench tests thus allowed observing a strong functional dissymmetry of the three-way valve: the response time of the valve turns out to be different depending on the direction of movement of the valve.

Indeed, the forces to open the valve on one side or the other are not necessarily the same (flow of the fluids, kinematics of the parts).

A traditional regulation structure for the local loop cannot handle this problem by meeting the demanding specifications (response time, overflow, stability margins), both during positive and negative setpoint variations. Repercussions on the global loop occur. In the present case, the temperature regulation is also no longer a proper regulation because the accuracy is no longer met.

This obviously poses regulation problems to have a homogeneous behavior of the local loop and therefore of the complete regulation.

A "slow" corrector synthesized by considering the "fast" transfer function will not allow meeting the requirements in terms of rapidity with regard to the slow behavior of the system during negative control variations. Conversely, a "fast" corrector synthesized by considering the "slow" behavior will not allow meeting the requirements in terms of overflow with regard to the fast behavior of the system during positive control variations.

The conventional servo-control solutions thus do not allow meeting the specifications both in terms of speed and overflow.

PRESENTATION OF THE INVENTION

According to a first aspect, the invention proposes a method for controlling a mechanism having a dissymmetric behavior, the mechanism comprising a first operating direction and a second operating direction, each direction having a different reaction to a similar control signal, the control method allowing generating, thanks to a module for controlling a calculator, a control signal from a setpoint signal, the method being characterized in that when the setpoint signal indicates to operate the mechanism along the first direction, the control module applies a first corrector to the setpoint signal in order to generate a control signal, when the setpoint signal indicates to operate the mechanism along the second direction, the control module applies a second corrector to the setpoint signal in order to generate a control signal, and in which the first and second correctors have different parameters, in order to compensate for the dissymmetric behavior of the mechanism.

In one embodiment, the corrector associated with a slow-reaction operating direction is fast; the corrector associated with a fast-reaction operating direction is slow. By "fast" and "slow" it is meant a relative ratio between the two, that is to say, the corrector associated with a slow operating direction is faster (or less slow) than the corrector associated with a fast operating direction.

In other words, if one operating direction reacts slower than the other, then the corrector associated with the slower operating direction is a faster corrector than the corrector associated with the less slow operating direction.

In one embodiment, the correctors are proportional-integral correctors.

In one embodiment, the choice of the corrector to be applied is based on the sign of an error signal corresponding to a difference between a setpoint signal and a measurement signal.

In one embodiment, the choice of the corrector to be applied is determined using a hysteresis parameter, with a different threshold depending on the two operating directions, the two thresholds being different. This allows a strategy of managing the correctors that avoid the presence of oscillations of a signal around a reference value, in particular around 0. A first threshold can be positive and the other threshold can be negative.

In one embodiment, the choice of the corrector to be applied is determined using a derivative of the output.

In one embodiment, the parameters of the correctors are variable depending on the operating points of the mechanical mechanism.

In one embodiment, the mechanism is a valve of a hydraulic circuit of a turbomachine, for example for supplying a gearbox with oil.

According to a second aspect, the invention relates to a system for controlling a mechanical mechanism having a dissymmetric behavior, the mechanism comprising a first operating direction and a second operating direction, each direction having a different reaction to a similar control signal, the control system comprising a control module allowing generating a control signal from a received setpoint signal, the control module comprising a first corrector and a second corrector, the correctors having different parameters, the first corrector being applied when the setpoint signal indicates to operate the mechanism along the first direction, the second corrector being applied when the setpoint signal indicates to operate the mechanism along the second direction.

This control system is advantageously configured to implement the steps of the method described above.

According to a third aspect, the invention relates to a use, in a method for controlling a mechanism having a dissymmetric behavior, of two different correctors, used in parallel and alternately, to compensate for the dissymmetric behavior of the mechanism.

PRESENTATION OF THE FIGURES

Other characteristics, aims and advantages of the invention will emerge from the following description, which is purely illustrative and not limiting, and which should be read in relation to the appended drawings, in which.

DETAILED DESCRIPTION

A detailed embodiment of the solution will now be described. This solution is again explained in relation to a three-way valve described in the introduction. The partly described "Modeling of the situation" context is considered.

A control system 1 and a control method will be described with reference to FIGS. 1 and 2.

This control system comprises a valve 10, for example of the three-way type (way one, way two and way three) and a calculator 20. Sensors 30 are advantageously provided to measure the position of the valve 10.

Three positions P1, P2 and P3 are defined for the three-way valve 10:

in position P1 (called stop position), way three (outlet way) is linked to way one (oil coming from an exchanger), in position P2 (also called stop position), way three is linked to way two (uncooled oil), in position P3, way three is linked to the other two ways (this position actually comprises an infinity of positions, allowing modulating the ratios of ways one and two).

The position P1, respectively P2, is typically obtained when the valve 10 receives a setpoint of 0V and a command of a few volts, for example 10V.

The valve 10 comprises two operating directions F+, F−. The operating direction F+, F− may relate to a rotation or a translation or a mixture of the two. Thus, two operating directions can be a clockwise rotation F+ and the reverse rotation F− or a translation F+ and its opposite translation F−.

Figure 1:
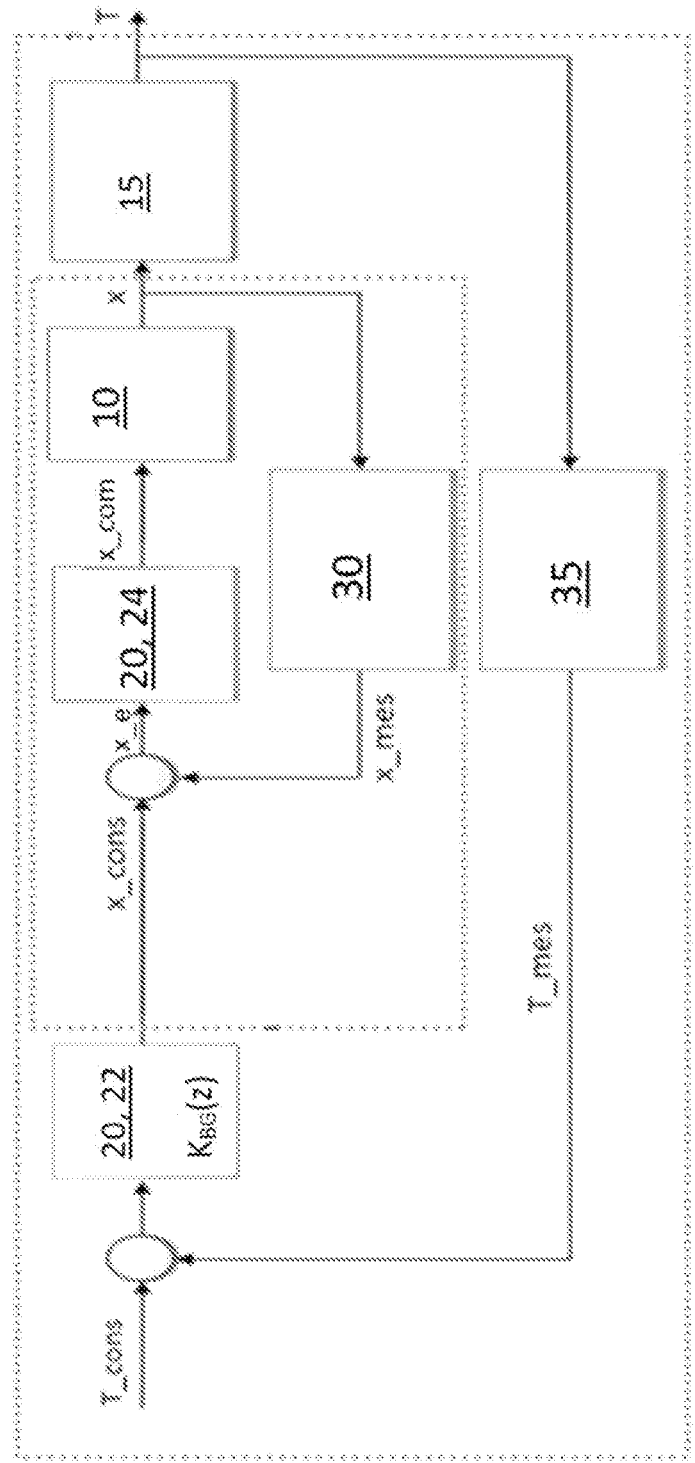
FIG. 1 illustrates a global management loop.

In order to exemplify the description, the operating direction F+ is arbitrarily defined as the direction from P1 to P2, which is slow, and the operating direction F− as the direction from P2 to P1, which is fast.

x_cons refers to the valve position setpoint (which is calculated by the global loop—see the transfer function $K_{BG}(z)$ in FIG. 1), x_com to the valve control setpoint (in volts) and x to the position of the valve 10.

The functional dissymmetry of the valve means that the output x(t) does not evolve in the same manner for two similar control setpoints x_com but related to a different operating direction F+, F−. In other words, the response time of the valve is different depending on the direction of movement of the valve 10.

Figure 2:
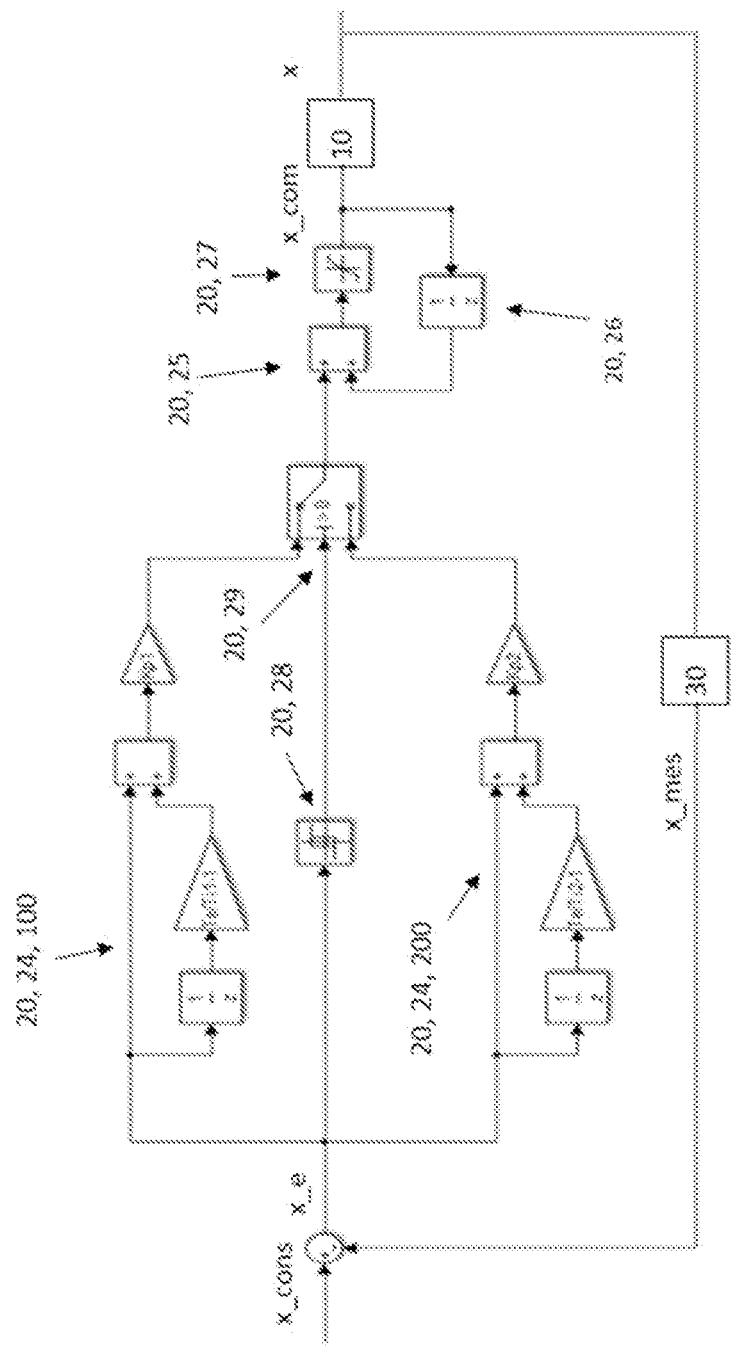
FIG. 2 illustrates a local loop with the two correctors in parallel according to one embodiment of the invention.

The position sensor 30 allows recovering the measurement x_mes of the position of the valve 10 (FIGS. 1 and 2).

The calculator 20 integrates a setpoint module 22, capable of generating the setpoint signal x_cons and a control module 24, which is capable of generating the control setpoint x_com (typically in Volt).

In order to resolve the problem related to the command of the dissymmetric valve of the valve, the calculator 20, more specifically the control module 24, comprises two correctors 100, 200 in parallel (FIG. 2), parameterized differently and which are each intended to operate for one of the two operating directions F+, F−.

The first corrector 100 is said to be fast and set to the function of transfer of the valve 10 in the operating direction F+ (from P1 to P2, slow direction) with the slow pole and the significant pure delay.

The second corrector 200 is said to be slow and set to the function of transfer of the valve 10 in the other operating direction F− (from P2 to P1, fast direction) with the fast pole and the low pure delay.

These two correctors 100, 200 are aimed to make the valve 10 symmetrical again in its operation.

The correctors 100, 200 receive as input a signal taking into account the difference between the setpoint signal x_cons and the measured signal x_mes. This difference is called error x_e.

The two correctors 100, 200 have different parameterizations.

As the valve 10 can be considered as a function of first-order transfer with pure delay, the two correctors 100, 200 can be of the proportional-integral (PI) type for which two setting parameters are necessary. In addition, these two parameters maintain a physical sense, which makes the settings intuitive.

Kp1, Kp2 define the respective proportional gains of the correctors PI 100, 200, Ti1 and Ti2 define the respective integral gains and Te the sampling time, for a discrete case example.

By parameterizing the two correctors 100, 200 differently, the calculator 20 applies a different treatment for the error x_e depending on the operating direction F+, F− of the valve 10, which allows compensating for the functional dissymmetry of the latter.

Mode of Application of the Corrector

The use of the two correctors 100, 200 being alternative (either the first corrector 100 or the second corrector 200), it is advantageous to implement a criterion allowing switching to one or other corrector 100, 200.

In this regard, several solutions can be envisaged.

The first solution consists in taking into account the sign of the servo-control error x_e, that is to say the difference between the position setpoint x_cons and the measured signal x_mes (x_e=x_cons−x_mes). However, there is a significant risk of alternation, in particular in steady state due to the noise on the position measurement or in case of overflow. Indeed, in case of overflow, even minimal, of the setpoint signal x_cons by the measured signal x_mes, the error x_e changes sign which implies a change of the corrector 100, 200.

Another preferred solution consists in introducing two thresholds to generate a hysteresis effect.

To avoid the pitfalls of the previous solution, a hysteresis parameter 28, with a switch 29 has been added in order to avoid alternating between the two correctors in an untimely manner when the error signal x_e is close to 0.

As the error signal x_e is generally centered on 0, the two hysteresis thresholds will be respectively positive and negative.

Thus, it is necessary with the hysteresis that the error x_e exceeds a threshold in each of the directions (positive and negative) before changing the corrector.

In the example presented here, the hysteresis parameter is set by using the following information:
- the noise on the position measurement is of about 0.03 V,
- the noise on the position setpoint is of about 0.02 V (indeed, the position setpoint is given by a global loop, subject to noise on the temperature measurement),
- the authorized overflows are of 0.2 V.

The consideration in the hysteresis parameter of the noise x_e on the measurement x_mes and on the setpoint x_cons allows not to change the corrector each time the error x_e changes the sign. Indeed, the error is very close to 0 in steady state and it will take values between −0.05 and 0.05 V because of the noise.

The consideration of the overflow allows not to change the corrector during a slight overflow. Indeed, the error changes the sign when the position exceeds the setpoint. It may be preferable to finish some transients with the same corrector.

The hysteresis parameter is finally chosen as the sum of these three variables, namely=0.25 V.

Assuming that the fast corrector 100 is selected, the switching to the slow corrector 200 will be effective when the position error becomes greater than 0.25 V.

Assuming that the slow corrector 200 is selected, the switching to the fast corrector 100 will be effective when the position error becomes less than −0.25 V.

Incrementer

However, the implemented corrector change may cause unwanted transient effects. Indeed, the integral actions of the proportional-integral correctors (and the states of the functions of transfer of the correctors in the general case) maintain a different control value and the switching from one corrector to another results in a sudden control peak.

In order to avoid these peaks, the calculator 20 can comprise an incrementer 25, which allows an incremental-type implementation: this consists in calculating the command increments from the error increments. The resulting command is then calculated as the sum of the command in the previous step (loop with the integrator 26) and of the command increment derived from the selected corrector 100, 200. For example, if the corrector 100 imposes a voltage of 5V and if the switching to the corrector 200 must impose a voltage of 10V, in the absence of the incrementer 25, the voltage would change abruptly. Thanks to the incrementer 25, the corrector 200 will give the command to increase by +0.2 V, to gradually bring the voltage from 5 to 10V.

Unlike the conventional implementation, the change of the corrector 100, 200 does not result in a change of the command but in a change of the command increment.

A saturator 27 is also provided to manage the effects of saturations: if a voltage of 12V is calculated as a command but if the system can only accept a voltage of 10V, the saturator will transform the 12V into 10V. This strategy also allows managing the saturations and the windup phenomena.

The invention has been described for a valve but applies to any mechanical element having a dissymmetric operation: an actuator or an actuator cylinder, etc. (any set or combination of servo-valve, cylinder).

The invention claimed is:
1. A method for controlling a mechanism having a dissymmetric behavior, the method comprising the following steps:

when a setpoint signal indicates to operate the mechanism along a first direction, a control module applies a first corrector to the setpoint signal in order to generate a control signal; and when the setpoint signal indicates to operate the mechanism along a second direction, the control module applies a second corrector to the setpoint signal in order to generate a control signal;

wherein the first and second correctors have different parameters in order to compensate for a behavior of the mechanism being dissymmetric in the first direction and in the second direction, and wherein one of the first and second correctors:

is associated with one among the first and second directions in which the mechanism reacts slower than in the other direction, and is a faster corrector than the other corrector.

2. The method according to claim 1, wherein the correctors are proportional-integral correctors.

3. The method according to claim 1, comprising choosing the corrector by using a hysteresis parameter, with different thresholds depending on the first and second directions.

4. The method according to claim 1, comprising choosing the corrector depending on a sign of an error signal corresponding to a difference between the setpoint signal and a measurement signal.

5. The method according to claim 1, wherein parameters of the correctors are variable depending on operating points of the mechanism.

6. The method according to claim 1, wherein the mechanism is a valve of a hydraulic circuit of a turbomachine.

7. A system, the system being configured for controlling a mechanism, the system comprising a module configured for generating a control signal from a received setpoint signal, the module comprising a first corrector and a second corrector, the first and second correctors having different parameters, the module being configured for applying the first corrector when the setpoint signal indicates to operate the mechanism along a first direction and for applying the second corrector when the setpoint signal indicates to operate the mechanism along a second direction in order to compensate for a behavior of the mechanism being dissymmetric in the first direction and in the second direction in reaction to a similar control signal, wherein one of the first and second correctors:

is associated with one among the first and second directions in which the mechanism reacts slower than in the other direction, and is a faster corrector than the other corrector.

8. A mechanism, the mechanism being configured to operate in a first direction and a second direction, the mechanism having a dissymmetric behavior in the first and second directions in reaction to a similar control signal, the mechanism comprising a system configured for controlling the mechanism, the system comprising a module configured for generating a control signal from a received setpoint signal, the module comprising a first corrector and a second corrector, the first and second correctors having different parameters, the module being configured for applying the first corrector when the setpoint signal indicates to operate the mechanism along the first direction and for applying the second corrector when the setpoint signal indicates to operate the mechanism along the second direction in order to compensate for the dissymmetric behavior of the mechanism, wherein one of the first and second correctors:

is associated with one among the first and second directions in which the mechanism reacts slower than in the other direction, and is a faster corrector than the other corrector.

9. The mechanism according to claim 8, wherein the mechanism comprises a valve of a hydraulic circuit for a gearbox of a turbomachine.

* * * * *